Patented Dec. 25, 1945

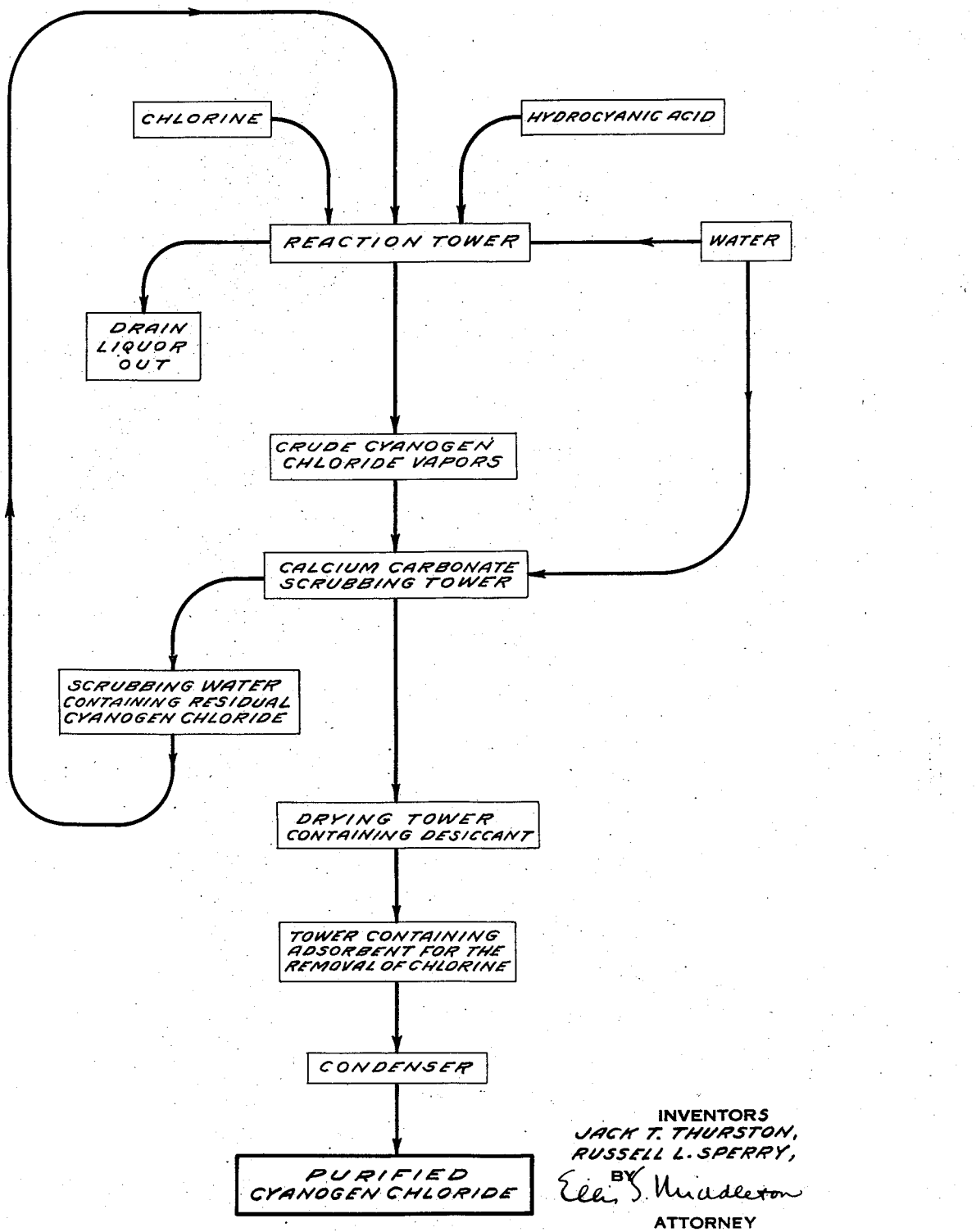

2,391,490

UNITED STATES PATENT OFFICE 2,391,490

PRODUCTION OF REFINED CYANOGEN CHLORIDE

Jack T. Thurston, Riverside, and Russell L. Sperry, Stamford, Conn., assignors to American Cyanamid Company, New York, N. Y., a corporation of Maine Application September 16, 1943, Serial No. 502,566

3 Claims. (Cl. 23—14)

The present invention relates to the production of cyanogen chloride substantially free from hydrogen chloride, water and chlorine.

It is well known in the art that cyanogen chloride made be produced by the action of free chlorine on hydrocyanic acid in accordance with the following equation:

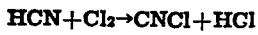

$$HCN + Cl_2 \rightarrow CNCl + HCl$$

According to the method described in U. S. Patent No. 1,588,731, the reaction may be conveniently effected in a column by admitting the chlorine at the bottom and allowing a dilute aqueous solution of hydrocyanic acid to enter near the top and trickle over a suitable packing material in countercurrent to the chlorine gas. The reaction may also be carried out by having the chlorine enter at the bottom, water at the top of the column and the hydrocyanic acid at a point between the two. The water, thus controlling the temperature, is also relied upon to collect the hydrogen chloride formed in the reaction and thereafter is removed at the base of the column as waste liquor. The cyanogen chloride vapors are withdrawn from the head of the column and condensed.

Cyanogen chloride thus produced may contain one or more of the following impurities: hydrogen chloride, water, and chlorine, in quantities sufficient to promote decomposition and/or polymerization of the product during storage. By carrying out the reaction with an excess of hydrocyanic acid, substantially no free chlorine will exist in the product. In such event the steps hereinafter recited for removal of chlorine may be omitted, but ordinarily it is undesirable to use such a necessary excess of hydrocyanic acid.

It has been found that cyanogen chloride undergoes hydrolysis in the presence of water at a relatively low temperature. The decomposition leads to the formation of ammonium chloride and carbon dioxide.

It has also been observed that cyanogen chloride readily polymerizes to cyanuric chloride under the influence of hydrogen chloride or when contaminated with chlorine, particularly in the presence of moisture.

The principal object of this invention resides in a method of producing and/or refining a crude cyanogen chloride wherein the product may be readily obtained free from hydrogen chloride, water and chlorine. Another important object is to provide cyanogen chloride in a pure state by a method requiring only simple apparatus with high efficiencies. A further object is to provide cyanogen chloride which will remain stable under normal storage conditions.

It has thus been found that the above objects may be attained by scrubbing crude cyanogen chloride obtained for instance according to the method of U. S. Patent No. 1,588,731 in vapor form with water in a calcium carbonate tower to remove the hydrogen chloride, drying in the vapor phase with a desiccant and treatment in the vapor phase with an adsorbent for removing free chlorine. If the crude cyanogen chloride contains no free chlorine, then this step may be omitted.

The present method, as shown in diagrammatic form in the accompanying flow sheet, consists in passing crude cyanogen chloride vapors through a calcium carbonate-water scrubbing tower, the latter being filled with marble chips over which flows a continuous spray of water.

The scrubbing water containing residual cyanogen chloride may be returned to the reaction tower and used as water required in the initial reaction, thus avoiding any loss of the product in a cyclic process other than the usual loss in the drain liquor from the reaction tower.

The cyanogen chloride vapors, free of hydrogen chloride, then pass through a drying tower containing a suitable desiccant, the latter being the neutral or acid type, such as for example, anhydrous calcium chloride, anhydrous calcium sulfate, anhydrous magnesium sulfate, anhydrous sodium sulfate, anhydrous copper sulfate or anhydrous silica gel. Since alkaline materials such as sodium hydroxide and potassium carbonate cause rapid hydrolysis of moist cyanogen chloride, the alkaline type of desiccant is undesirable.

When the dry cyanogen chloride vapors contain chlorine, they then pass through a tower containing an adsorbent for free chlorine, and then into a condensing unit which is cooled by a surrounding ice-water bath maintained at 0°–5° C.

Suitable adsorbents for the removal of chlorine from crude cyanogen chloride include activated coconut charcoal and wood charcoal, especially the cheaper wood charcoals, some of which have high chlorine adsorption capacities.

The charcoal may be activated by heating to a temperature within the range of 200° to 250° C. for three to five hours.

The chlorine is removed by preferential adsorption, that is to say the activated charcoal initially adsorbs considerable cyanogen chloride, for example in the case of activated coconut charcoal about 50% by weight along with such small quantities of chlorine as are present, and then the chlorine in the on-coming gases displaces an equivalent amount of cyanogen chloride. Consequently, the charcoal eventually contains substantially no cyanogen chloride and only chlorine. When the charcoal is exhausted with respect to chlorine adsorption, reactivation is accomplished by heating, as mentioned above.

During the initial passing of the cyanogen chloride and chlorine over the charcoal, the latter heats up due to the exothermic heat of adsorption. It is desirable, therefore, to cool the charcoal during this period, such as by the external application of water to the charcoal tower, to prevent an undue rise in temperature and consequent conversion of the cyanogen chloride to cyanuric chloride.

Example

Crude water-wet cyanogen chloride (containing 0.23% chlorine and 0.07% hydrogen chloride) in vapor form was passed through the refining towers as described above. Anhydrous calcium chloride was used as the desiccant in the drying tower, and activated coconut charcoal as the adsorbent in the tower for removing the chlorine. The dry, purified vapors were condensed and the recovered product obtained free of chlorine and hydrogen chloride with only an insignificant amount of water. Samples of the purified cyanogen chloride did not decompose or polymerize in steel test cups and glass pressure bottles during test periods of from 16 to 60 days at temperatures within the range of from ordinary room temperature to 65° C.

By returning a part or all of the water from the carbonate tower to the initial reaction zone, any cyanogen chloride therein is conserved.

The method herein described is of particular utility in that it provides a marketable product of high purity.

While the invention has been described with particular reference to specific embodiments, it is to be understood that it is not to be limited thereto, but is to be construed broadly and restricted solely by the scope of the appended claims.

We claim:

1. A method of refining crude cyanogen chloride containing hydrogen chloride and chlorine which includes the steps of passing vapors of the crude cyanogen chloride through a bed of calcium carbonate over which water is flowing, then over a non-alkaline desiccant and thereafter passing the dry vapors over activated charcoal, cooling the charcoal to dissipate the exothermic heat of adsorption, condensing and recovering the thus purified cyanogen chloride.

2. The method of claim 1 further characterized in that the activated charcoal is chosen from the group consisting of activated coconut charcoal and activated wood charcoal.

3. The method of claim 1 further characterized by adsorbing cyanogen chloride and chlorine simultaneously in activated charcoal and thereafter displacing the cyanogen chloride by the chlorine contained in the dry oncoming vapors.

JACK T. THURSTON.
RUSSELL L. SPERRY.